(12) United States Patent
Chippaux (10) Patent No.: US 12,358,246 B2
(45) Date of Patent: Jul. 15, 2025

(54) ASSEMBLY FOR MOLDING A LENS AND A METHOD THEREOF

(71) Applicant: ESSILOR INTERNATIONAL, Charenton-le-Pont (FR)

(72) Inventor: Laurent Chippaux, Ladkrabang—Thaïlande (FR)

(73) Assignee: Essilor International, Charenton-le-Pont (FR)

( * ) Notice: Subject to any disclaimer, the term of this patent is extended or adjusted under 35 U.S.C. 154(b) by 200 days.

(21) Appl. No.: 18/345,602

(22) Filed: Jun. 30, 2023

(65) Prior Publication Data
US 2024/0042711 A1   Feb. 8, 2024

(30) Foreign Application Priority Data
Aug. 5, 2022 (EP) .................................... 22306189

(51) Int. Cl.
*B29D 11/00* (2006.01)

(52) U.S. Cl.
CPC .. *B29D 11/00528* (2013.01); *B29D 11/00538* (2013.01); *B29D 11/00548* (2013.01)

(58) Field of Classification Search
CPC ........ B29D 11/00528; B29D 11/00538; B29D 11/00548
See application file for complete search history.

(56) References Cited

U.S. PATENT DOCUMENTS

| | | | | |
|---|---|---|---|---|
| 4,090,830 | A | * | 5/1978 | Laliberte .................. G02B 1/08 425/117 |
| 5,286,419 | A | * | 2/1994 | van Ligten ............. B29C 69/02 264/2.6 |
| 2007/0202265 | A1 | * | 8/2007 | Berzon .............. B29D 11/0073 427/407.1 |
| 2009/0091825 | A1 | | 4/2009 | Saito et al. |
| 2016/0349538 | A1 | * | 12/2016 | Ogaya ....................... G02C 7/12 |
| 2017/0299782 | A1 | * | 10/2017 | Tamura .................. G02B 5/305 |
| 2019/0293966 | A1 | * | 9/2019 | Tamura ............ B29D 11/00413 |

* cited by examiner

*Primary Examiner* — Mathieu D Vargot
(74) *Attorney, Agent, or Firm* — NIXON & VANDERHYE (57) ABSTRACT

An assembly for molding a lens including a peripheral gasket member having a surrounding wall around an axis to define a through-cavity, the surrounding wall having an internal circumferential ridge portion protruding inwardly towards the axis and partitioning the surrounding wall into an upper wall portion and a lower wall portion, wherein the internal circumferential ridge portion includes a first ridge-flank and a second ridge-flank; a film disposed at the first ridge-flank; an annular member disposed over the film to retain the film between the annular member and the first ridge-flank; a first mold part disposed with a circumferential edge in abutment with the upper wall portion; and a second mold part disposed opposite the first mold part and with a circumferential edge in abutment with the lower wall portion, wherein the peripheral gasket member, the first mold part and the second mold part define a molding cavity therebetween.

13 Claims, 6 Drawing Sheets

ASSEMBLY FOR MOLDING A LENS AND A METHOD THEREOF

CROSS-REFERENCE TO RELATED APPLICATIONS

This application claims priority to EP Patent Application No. 22306189.6 filed Aug. 5, 2022, the entire contents of which are hereby incorporated by reference.

FIELD

The present disclosure generally relates to an assembly for molding a lens and a method of molding a lens.

BACKGROUND

Molding of polarized lenses is conventionally a high complexity process, whereby yield and quality are dependent on the skill of the operator. The polarized lens is generally made of two optical lens layers sandwiching a polarizing film. The conventional process of assembling a mold assembly for molding the polarized lens is usually done manually by the operator as the placement of the polarizing film is a precise and delicate step that directly affects the quality and success of the molding process. Typically, the conventional mold assembly includes a top mold, a bottom mold and a gasket therebetween to define a molding cavity. To insert the polarizing film in the conventional process, the gasket is usually expanded so that the polarizing film can be placed in the molding cavity and held by slots or grooves along an inner circumference of the gasket. However, the polarizing film is very delicate and may be deformed or damaged when being placed into the gasket during the conventional process. The gasket may also be deformed during the conventional process. Furthermore, the quality and time taken to successfully place the polarizing film into the conventional gasket is dependent on the skill of the operator.

Therefore, there exists a need for a more reliable, less operator-dependent and more efficient solution for molding polarized lenses. Document US2009091825 discloses an assembly comprising a pair of lens molds, a gasket, a polarized film located between the molds, a holding ring and a clamp. The gasket is formed with synthetic rubber and has a substantially cylindrical shape. It has a first step to which the first lens mold is to be interfitted and a second step to which the other lens mold is to be interfitted. Between these steps, a mount is provided, on which a periphery of the polarized film 14 and the holding ring 15 is placed. The main difficulty with this solution is to ensure proper placement of the elements and a good sealing of the assembly.

SUMMARY

According to various embodiments, there is provided an assembly for molding a lens as claimed in claim 1. The assembly including a peripheral gasket member having a surrounding wall around an axis to define a through-cavity extending along the axis. The surrounding wall having an internal circumferential ridge portion protruding inwardly towards the axis from an inner side of the surrounding wall in a manner so as to partition the surrounding wall into an upper wall portion and a lower wall portion respectively above and below the internal circumferential ridge portion with respect to the axis. The internal circumferential ridge portion includes a first ridge-flank directed in a first direction corresponding to a direction extending along the axis from the internal circumferential ridge portion to the upper wall portion, and a second ridge-flank directed in a second direction corresponding to a direction extending along the axis from the internal circumferential ridge portion to the lower wall portion. The assembly including a film disposed at the first ridge-flank of the internal circumferential ridge portion of the peripheral gasket member with a segment of a peripheral border region of the film in abutment with the first ridge-flank of the internal circumferential ridge portion of the peripheral gasket member. The assembly including an annular member disposed over the segment of the peripheral border region of the film in a manner so as to retain the segment of the peripheral border region of the film between the annular member and the first ridge-flank of the internal circumferential ridge portion of the peripheral gasket member. The assembly including a first mold part disposed with a circumferential edge of the first mold part in abutment with the upper wall portion of the peripheral gasket member. The assembly including a second mold part disposed in an opposing manner with respect to the first mold part and with a circumferential edge of the second mold part in abutment with the lower wall portion of the peripheral gasket member. The peripheral gasket member, the first mold part and the second mold part define a molding cavity therebetween.

According to various embodiments, there is provided a method of molding a lens as claimed in claim 10. The method including providing a peripheral gasket member including a surrounding wall around an axis to define a through-cavity extending along the axis. The surrounding wall having an internal circumferential ridge portion protruding inwardly towards the axis from an inner side of the surrounding wall in a manner so as to partition the surrounding wall into an upper wall portion and a lower wall portion respectively above and below the internal circumferential ridge portion with respect to the axis. The internal circumferential ridge portion includes a first ridge-flank directed in a first direction corresponding to a direction extending along the axis from the internal circumferential ridge portion to the upper wall portion, and a second ridge-flank directed in a second direction corresponding to a direction extending along the axis from the internal circumferential ridge portion to the lower wall portion. The method including disposing a film at the first ridge-flank of the internal circumferential ridge portion of the peripheral gasket member with a segment of a peripheral border region of the film in abutment with the first ridge-flank of the internal circumferential ridge portion of the peripheral gasket member. The method including disposing an annular member over the segment of the peripheral border region of the film in a manner so as to retain the segment of the peripheral border region of the film between the annular member and the first ridge-flank of the internal circumferential ridge portion of the peripheral gasket member. The method including disposing a first mold part with a circumferential edge of the first mold part in abutment with the upper wall portion of the peripheral gasket member. The method including disposing a second mold part in an opposing manner with respect to the first mold part and with a circumferential edge of the second mold part in abutment with the lower wall portion of the peripheral gasket member. The method including filing a molding cavity, defined by the peripheral gasket member, the first mold part and the second mold part, with a liquid molding material for molding the lens.

BRIEF DESCRIPTION OF THE DRAWINGS

For a more complete understanding of the description provided herein and the advantages thereof, reference is now

DETAILED DESCRIPTION OF EMBODIMENTS

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "back", "lateral", "side", "up", "down", "vertical", "horizontal" etc., if and when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to an assembly for molding a lens and a method of molding a lens. The lens may be a polarized lens. Further, the lens may have an ultra high index (UHI), a high index (HI), a mid-index (MI), or a low index (LI). Various embodiments may remove the difficulty of polarizing film insertion of the convention process. Further, various embodiments may not require the step of expanding the gasket for inserting the polarizing film. Hence, various embodiments may avoid or prevent deforming the gasket. In addition, various embodiment may no longer require fitting the polarizing film into a built-in slot or a built-in groove of the gasket. Thus, various embodiments may avoid the need for precise handling and fitting of the polarizing film. Various embodiments may also potentially avoid the need for a skilled operator for inserting the polarizing film to the gasket or may potentially be automated to insert the polarizing film to the gasket.

According to various embodiments, the method of molding the lens may include assembling a bottom mold (or a second mold part) with a gasket (or a peripheral gasket member); laying a film on an internal circumferential ridge of the gasket; placing an annular member (e.g. a washer) on the film; assembling a top mold (or a first mold part) to the gasket; and filling a molding cavity with liquid molding material. Accordingly, in this manner, the film may be clamped between the internal circumferential ridge of the gasket and the annular member. Hence, manipulation of the film and/or the gasket in the manner of the conventional polarizing film insertion step may be eliminated. Thus, the difficulty and issues associated with the conventional polarizing film insertion step may be avoided.

FIG. 1A, FIG. 2A, FIG. 3A and FIG. 4A depict a sequence of a method of assembling a molding assembly 100 (or assembly) for molding a lens according to various embodiments. FIG. 1A, FIG. 2A, FIG. 3A, FIG. 4A and FIG. 5 depict a sequence of a method of molding a lens according to various embodiments. According to various embodiments, the method of molding the lens may include the method of assembling the molding assembly 100 for molding the lens and subsequently filling a molding cavity 102 of the molding assembly 100 with liquid molding material 105 for molding the lens. FIG. 5 depict the molding assembly 100 being filled with liquid molding material 105 according to various embodiments.

Figure 1A:
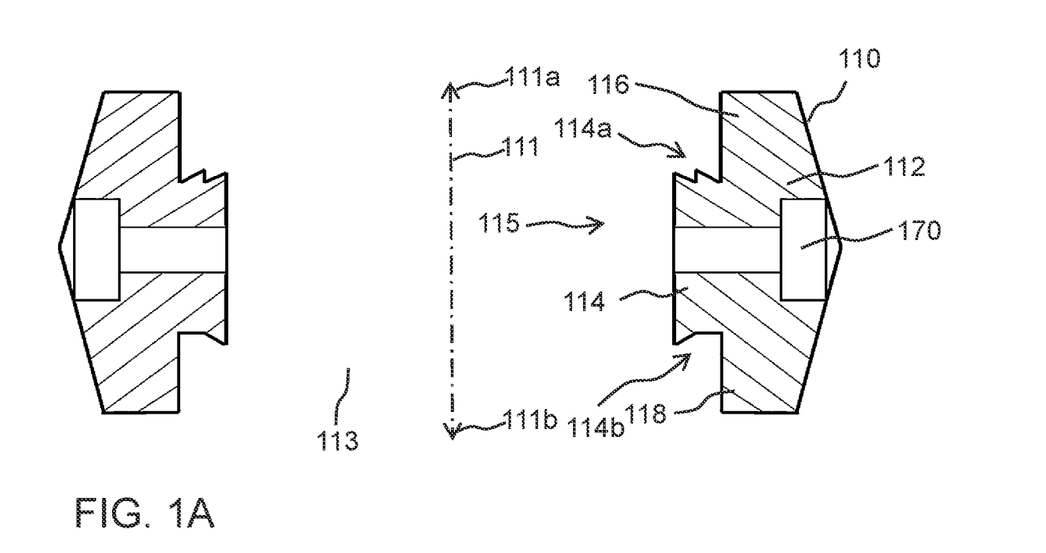
FIG. 1A depicts a schematic cross-sectional view of a peripheral gasket member of a molding assembly according to various embodiments.
Figure 1B:
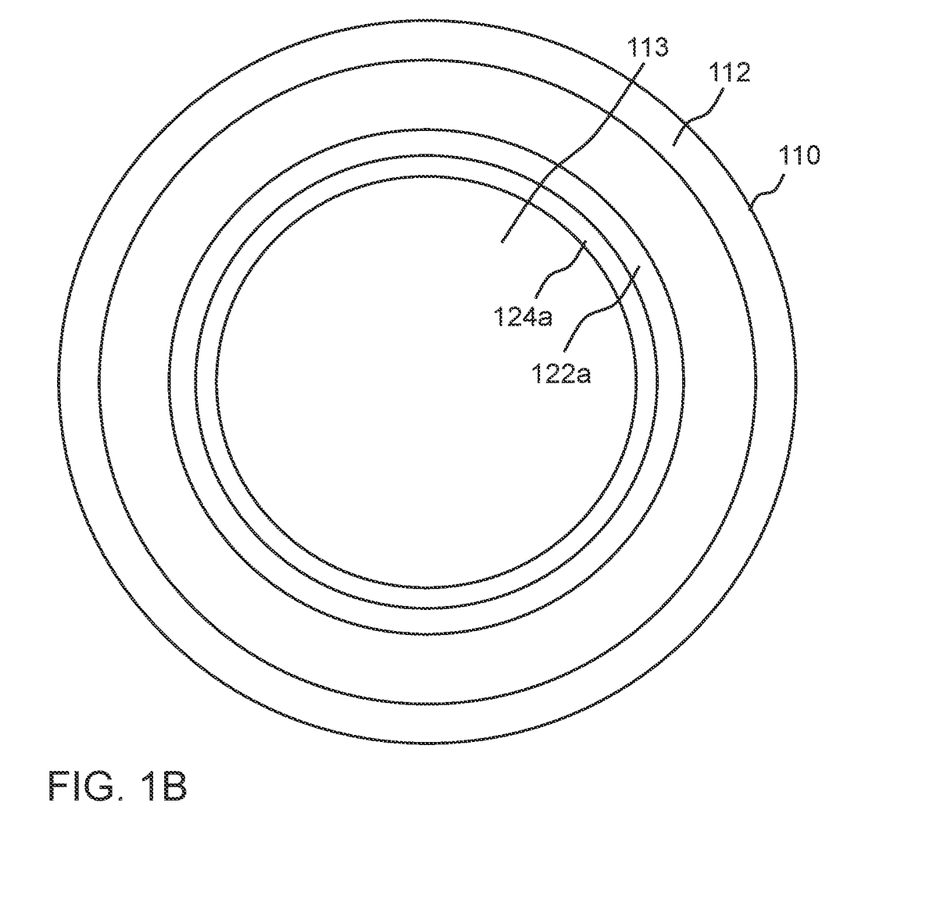
FIG. 1B depicts a schematic top view of the peripheral gasket member of FIG. 1A according to various embodiments.
Figure 1C:
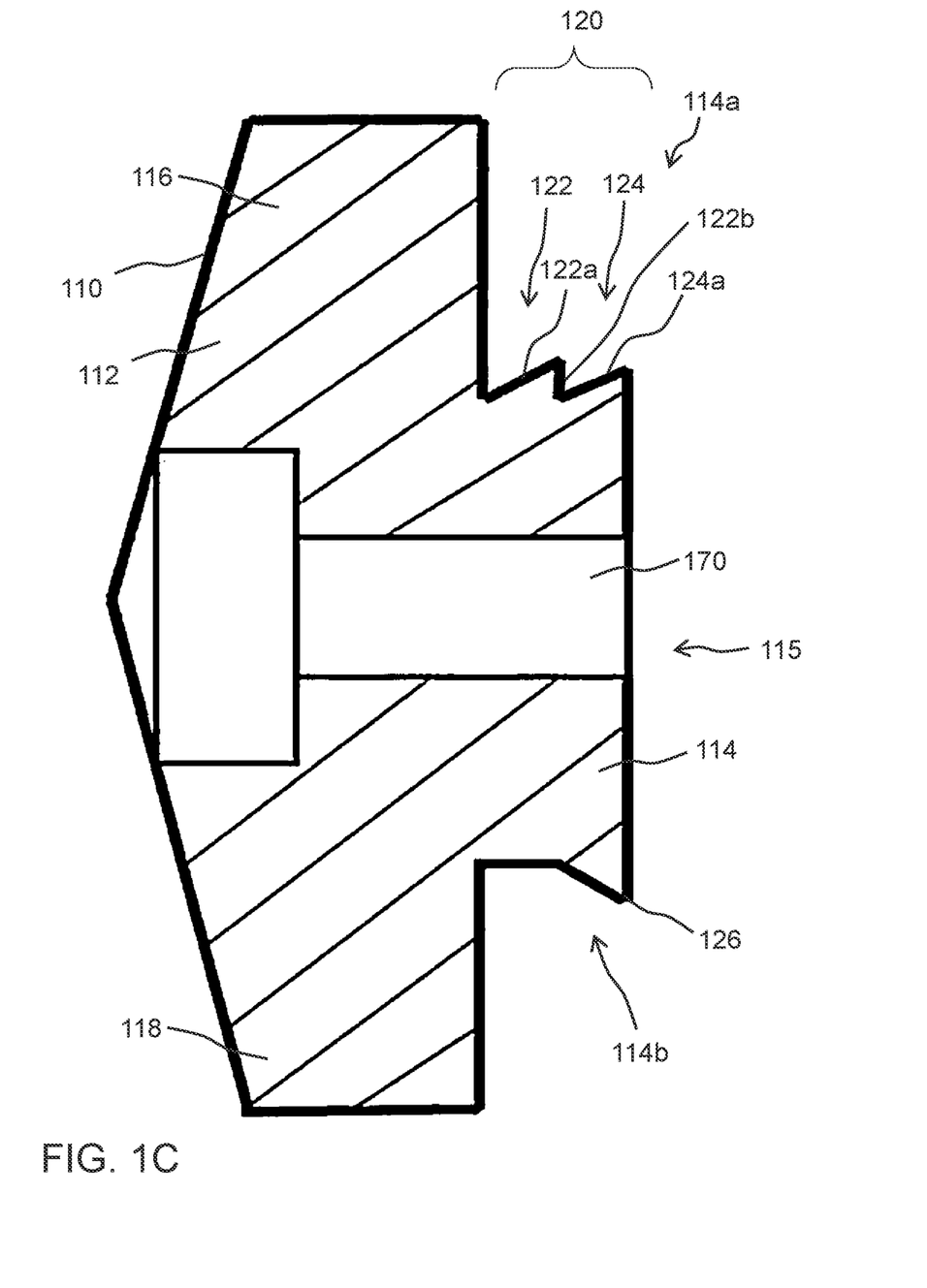
FIG. 1C depicts an enlarged schematic cross-sectional view of a left portion of the peripheral gasket member of FIG. 1A according to various embodiments.
Figure 4A:
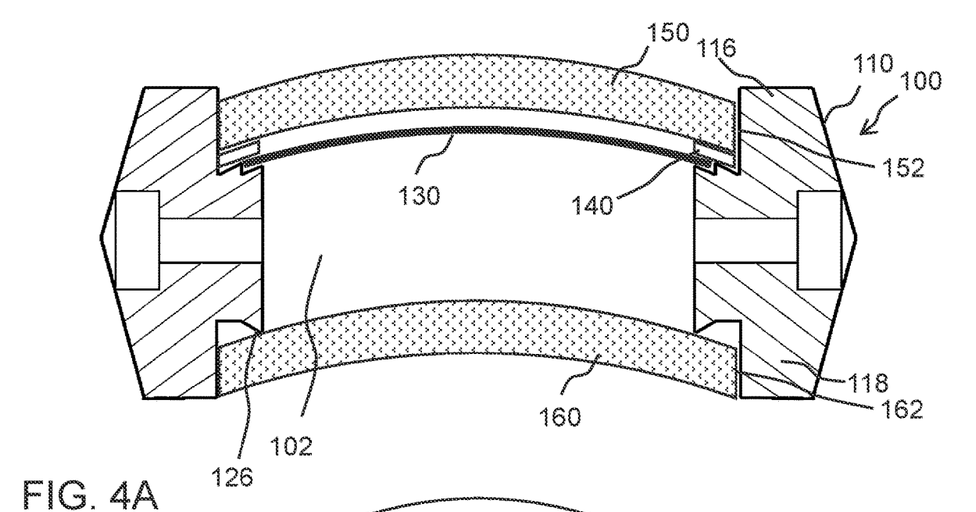
FIG. 4A depicts a schematic cross-sectional view of a molding assembly for molding a lens according to various embodiments.
Figure 4B:
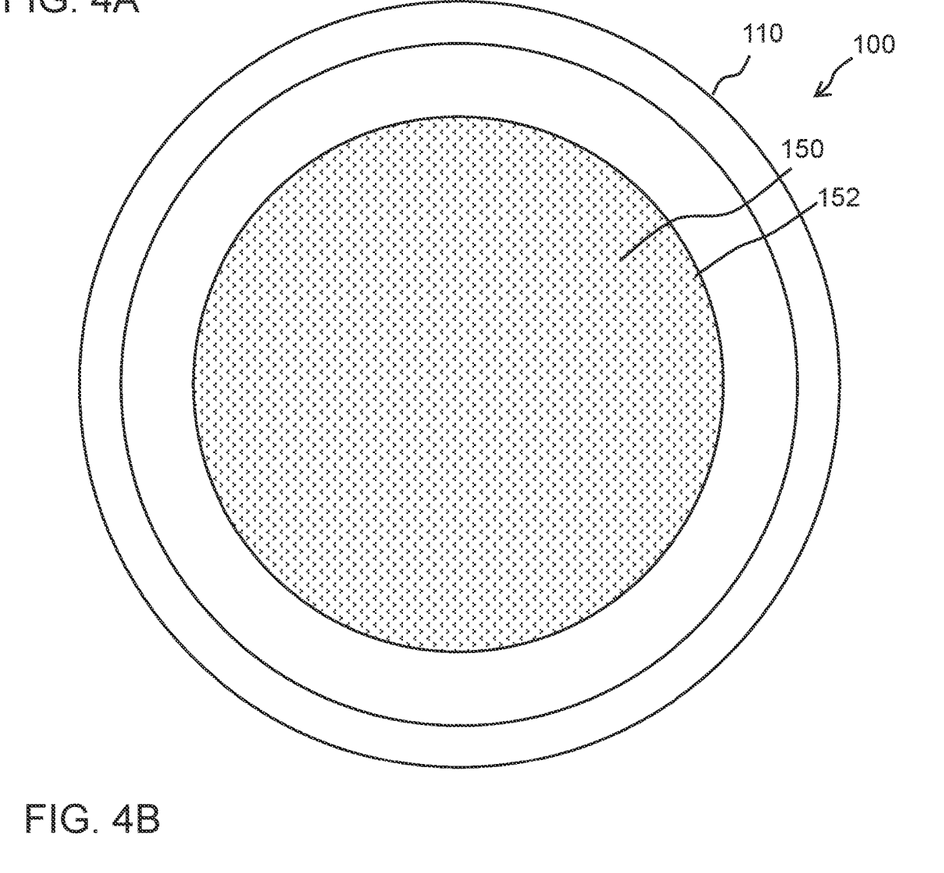
FIG. 4B depicts a schematic top view of the molding assembly of FIG. 4A according to various embodiments.
Figure 5:
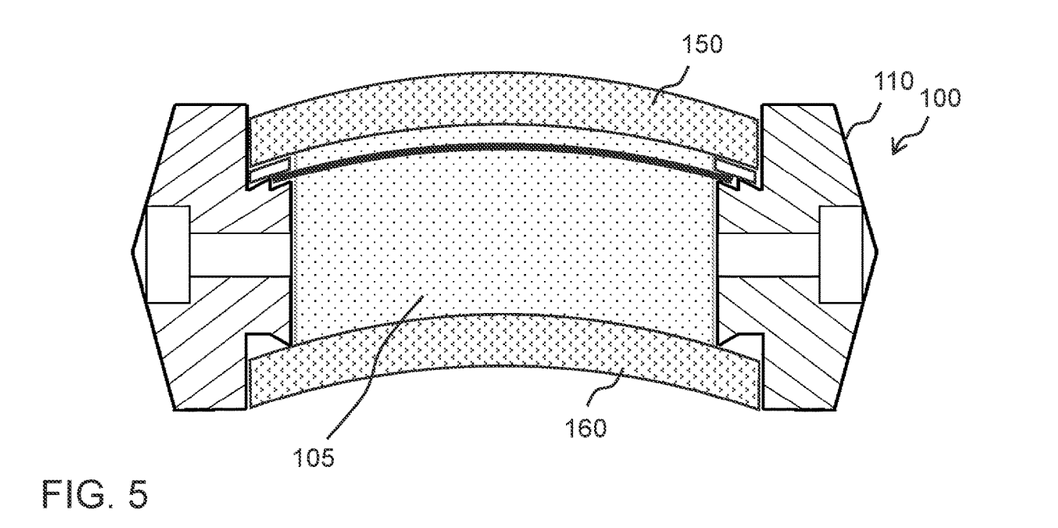
FIG. 5 depict the molding assembly being filled with liquid molding material according to various embodiments.

FIG. 4A depicts a schematic cross-sectional view of the molding assembly 100 for molding a lens according to various embodiments. FIG. 4B depicts a schematic top view of the molding assembly 100 of FIG. 4A according to various embodiments. FIG. 1A depicts a schematic cross-sectional view of a peripheral gasket member 110 of the molding assembly 100 of FIG. 4A according to various embodiments. FIG. 1B depicts a schematic top view of the peripheral gasket member 110 of FIG. 1A according to various embodiments. FIG. 1C depicts an enlarged schematic cross-sectional view of a left portion of the peripheral gasket member 110 of FIG. 1A according to various embodiments.

According to various embodiments, the molding assembly 100 may include the peripheral gasket member 110. The peripheral gasket member 110 may have a structure including a surrounding wall 112 around an axis 111 to define a through-cavity 113 extending along the axis 111. According to various embodiments, the axis 111 may be a centerline of the through-cavity 113 defined by the surrounding wall 112 of the peripheral gasket member 110. Hence, the centerline of the through-cavity 113 may coincide with the axis 111. Further, a central axis of the surrounding wall 112 of the peripheral gasket member 100 may coincide with the axis 111. As an example, according to various embodiments, the surrounding wall 112 of the peripheral gasket member 110 may be in the form of a ring-shaped structure or an annular wall structure. Accordingly, the axis 111 may pass through a center of the ring-shaped structure or the annular wall structure.

According to various embodiments, the surrounding wall 112 of the peripheral gasket member 110 may include an internal circumferential ridge portion 114. The internal circumferential ridge portion 114 of the surrounding wall 112 of the peripheral gasket member 110 may be protruding inwardly towards the axis 111 from an inner side 115 of the surrounding wall 112. The inner side 115 of the surrounding wall 112 may be an inward facing side of the surrounding wall 112. For example, the inner side 115 of the surrounding wall 112 may be an inner circumference or an inner circumferential surface of the surrounding wall 112 when the surrounding wall 112 is in the form of the ring-shaped structure or the annular wall structure. The internal circumferential ridge portion 114 may be a protrusion along the inner side 115 of the surrounding wall 112 which may encircle the axis 111. Hence, the internal circumferential ridge portion 114 may form a continuous endless shelf-like structure protruding inwards from the inner side 115 of the surrounding wall 112. Accordingly, the internal circumferential ridge portion 114 may serve as a constriction along the through-cavity 113 of the peripheral gasket member 110.

According to various embodiments, the internal circumferential ridge portion 114 of the surrounding wall 112 of the peripheral gasket member 110 may partition the surrounding wall 112 into an upper wall portion 116 and a lower wall portion 118 respectively above and below the internal circumferential ridge portion 114 with respect to the axis 111. Accordingly, the internal circumferential ridge portion 114 may be at a middle of the inner side 115 of the surrounding wall 112 with respect to the axis 111. Further, the upper wall portion 116 and the lower wall portion 118 may be on opposite flanks of the internal circumferential ridge portion 114. Hence, by taking a reference point along the axis 111 corresponding to a position of the internal circumferential ridge portion 114, positions of the upper wall portion 116 and the lower wall portion 118 may correspond to points respectively above and below the reference point along the axis 111.

According to various embodiments, the internal circumferential ridge portion 114 of the surrounding wall 112 of the peripheral gasket member 110 may include a first ridge-flank 114*a*. The first ridge-flank 114*a* of the internal circumferential ridge portion 114 may be directed in a first direction 111*a* corresponding to a direction extending along the axis 111 from the internal circumferential ridge portion 114 to the upper wall portion 116. Accordingly, the first ridge-flank 114*a* of the internal circumferential ridge portion 114 may be facing or directed towards an end opening of the through-cavity 113 of the peripheral gasket member 110 proximal to the upper wall portion 116.

According to various embodiments, the internal circumferential ridge portion 114 of the surrounding wall 112 of the peripheral gasket member 110 may include a second ridge-flank 114*b*. The second ridge-flank 114*b* of the internal circumferential ridge portion 114 may be directed in a second direction 111*b* corresponding to a direction extending along the axis 111 from the internal circumferential ridge portion 114 to the lower wall portion 118. Accordingly, the second ridge-flank 114*b* of the internal circumferential ridge portion 114 may be facing or directed towards an end opening of the through-cavity 113 of the peripheral gasket member 110 proximal to the lower wall portion 118.

Figure 2A:
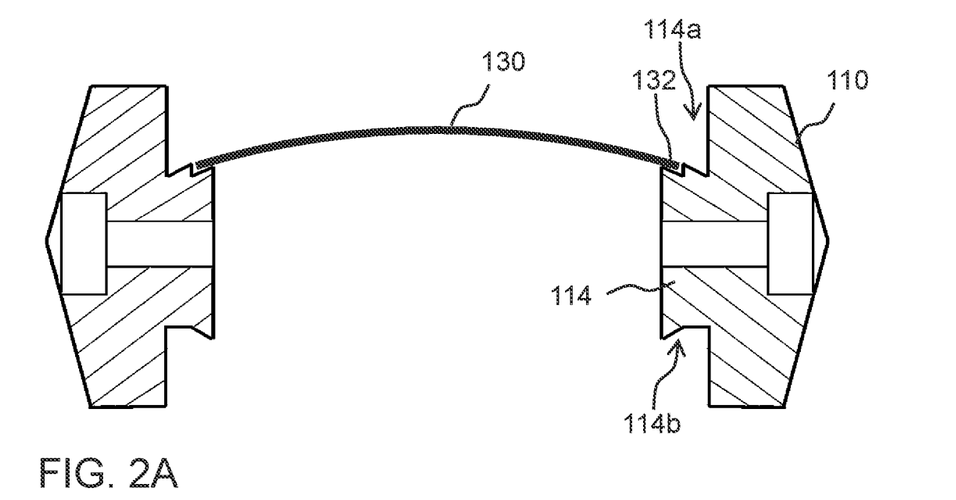
FIG. 2A depicts a schematic cross-sectional view of a film and the peripheral gasket member of FIG. 1A according to various embodiments.
Figure 2B:
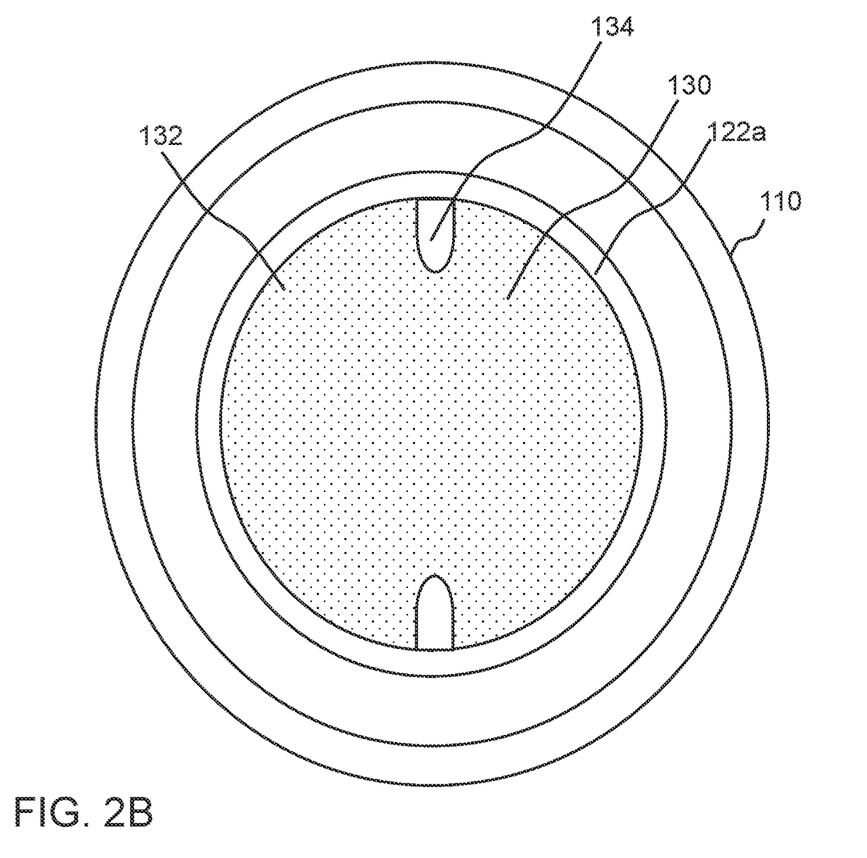
FIG. 2B depicts a schematic top view of FIG. 2A according to various embodiments.

FIG. 2A depicts a schematic cross-sectional view of a film 130 and the peripheral gasket member 110 according to various embodiments. FIG. 2B depicts a schematic top view of FIG. 2A according to various embodiments. According to various embodiments, the molding assembly 100 may include the film 130. The film 130 may be a polarizing film to be embedded or sandwiched within the lens to be molded. According to various embodiments, the film 130 may be disposed at the first ridge-flank 114*a* of the internal circumferential ridge portion 114 of the surrounding wall 112 of the peripheral gasket member 110. The film 130 may be disposed with a segment of a peripheral border region 132 of the film 130 in abutment with the first ridge-flank 114*a* of the internal circumferential ridge portion 114 of the surrounding wall 112 of the peripheral gasket member 110. Accordingly, the first ridge-flank 114*a* of the internal circumferential ridge portion 114 of the surrounding wall 112 of the peripheral gasket member 110 may be supporting the film 130 with the segment of the peripheral border region 132 of the film 130 resting on the first ridge-flank 114*a* of the internal circumferential ridge portion 114 of the surrounding wall 112 of the peripheral gasket member 110. Hence, the film 130 may be suspended across the through-cavity 113 of the peripheral gasket member 110 with the segment of the peripheral border region 132 of the film 130 supported by the first ridge-flank 114*a* of the internal circumferential ridge portion 114 of the surrounding wall 112 of the peripheral gasket member 110.

Figure 3A:
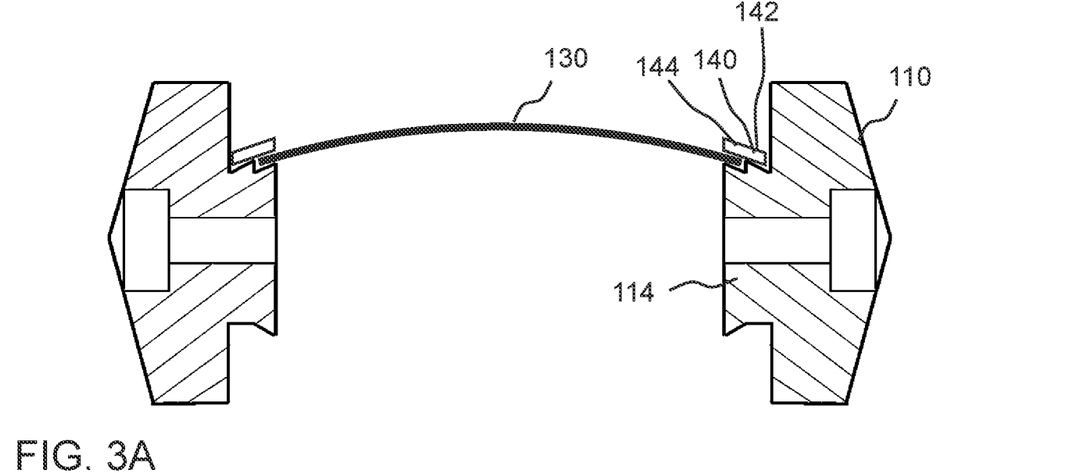
FIG. 3A depicts a schematic cross-sectional view of an annular member, the film of FIG. 2A and the peripheral gasket member of FIG. 1A according to various embodiments.
Figure 3B:
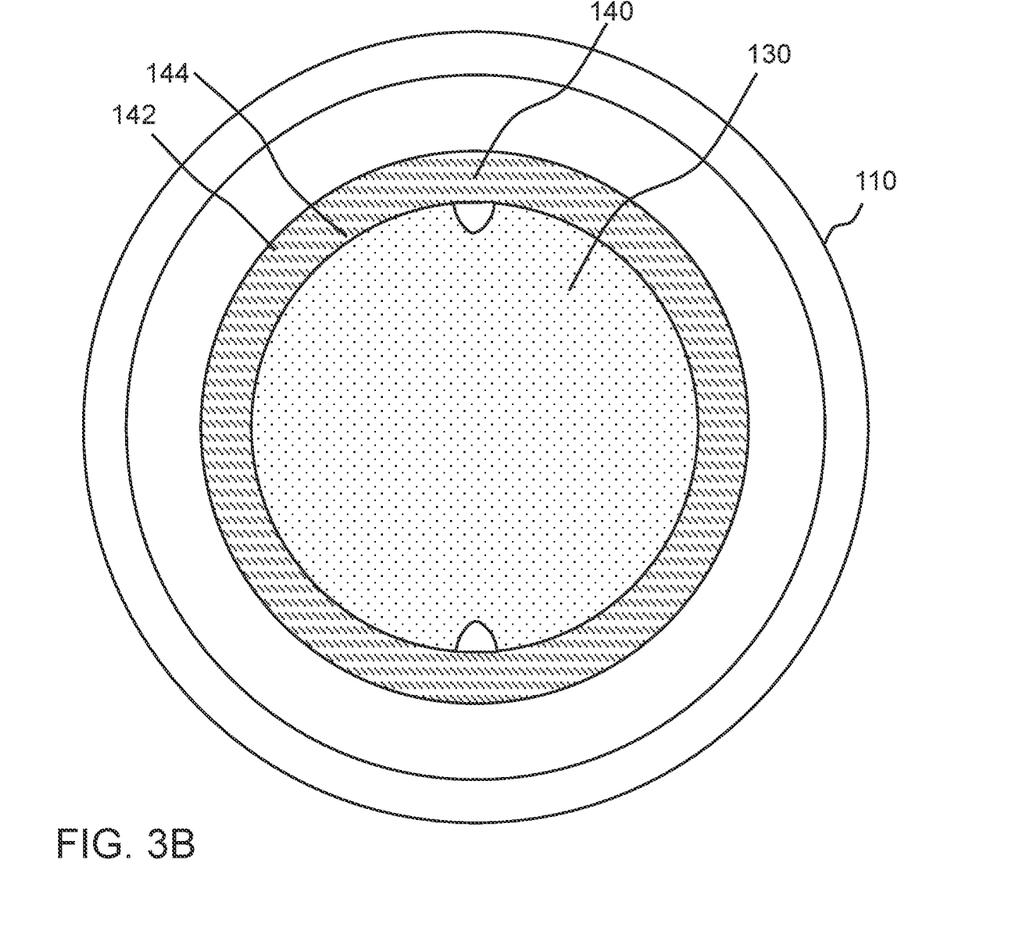
FIG. 3B depicts a schematic top view of FIG. 3A according to various embodiments.

FIG. 3A depicts a schematic cross-sectional view of an annular member 140, the film 130 and the peripheral gasket member 110 according to various embodiments. FIG. 3B depicts a schematic top view of FIG. 3A according to various embodiments. According to various embodiments, the molding assembly 100 may include the annular member 140. The annular member 140 may be disposed over the segment of the peripheral border region 132 of the film 130. The annular member 140 may be disposed in a manner so as to retain the segment of the peripheral border region 132 of the film 130 between the annular member 140 and the first ridge-flank 114*a* of the internal circumferential ridge portion 114 of the surrounding wall 112 of the peripheral gasket member 110. Accordingly, with the film 130 rested or supported on the first ridge-flank 114*a* of the internal circumferential ridge portion 114 of the surrounding wall 112 of the peripheral gasket member 110, the annular member 140 may be placed or stacked on the film 130 such that the film 130 may be between the annular member 140 and the first ridge-flank 114*a* of the internal circumferential ridge portion 114 of the surrounding wall 112 of the peripheral gasket member 110. Hence, the film 130 may be kept in place by the annular member 140 and first ridge-flank 114*a* of the internal circumferential ridge portion 114 of the surrounding wall 112 of the peripheral gasket member 110 with the segment of the peripheral border region 132 of the film 130 between the annular member 140 and the first ridge-flank 114*a* of the internal circumferential ridge portion 114 of the surrounding wall 112 of the peripheral gasket member 110. In this manner, the film 130 may be fitted to the peripheral gasket member 110 in a simple and efficient manner eliminating or minimizing a risk of deforming or damaging the film 130 and/or the peripheral gasket member 110. Further, fitting of the film 130 to the peripheral gasket member 110 may not require highly skilled operator or may be automated. According to various embodiments, the segment of the peripheral border region 132 of the film 130 may be loosely retained between the annular member 140 and the first ridge-flank 114*a* of the internal circumferential ridge portion 114 of the surrounding wall 112 of the peripheral gasket member 110.

Referring to FIG. 4A and FIG. 4B, the molding assembly 100 may include a first mold part 150 (or a top mold or a concave mold) and a second mold part 160 (or a bottom mold or a convex mold). The first mold part 150 and the second mold part 160 may be respectively fitted to the peripheral gasket member 110 from the two opposite end openings of the through-cavity 113 of the peripheral gasket member 110. Accordingly, the first mold part 150 and the second mold part 160 may be respectively cover the two opposite end openings of the through-cavity 113 of the peripheral gasket member 110.

According to various embodiments, the first mold part 150 may be disposed with a circumferential edge 152 of the first mold part 150 in abutment with the upper wall portion 116 of the peripheral gasket member 110. Accordingly, the first mold part 150 may be fitted to the peripheral gasket member 110 in a manner such that the circumferential edge 152 of the first mold part 150 may be touching or adjoining the upper wall portion 116 of the peripheral gasket member 110. According to various embodiments, the circumferential edge 152 of the first mold part 150 may be fully or entirely abutting the upper wall portion 116 of the peripheral gasket member 110 such that there is no gap around the first mold part 150 between the circumferential edge 152 of the first mold part 150 and the upper wall portion 116 of the peripheral gasket member 110. Further, according to various embodiments, the circumferential edge 152 of the first mold part 150 may be in sealing engagement with the upper wall portion 116 of the peripheral gasket member 110 in a manner such that the first mold part 150 and the peripheral gasket member 110 may be hermetically sealed together in a leak-proof manner.

According to various embodiments, the second mold part 160 may be disposed in an opposing manner with respect to the first mold part 150. Accordingly, the first mold part 150 and the second mold part 160 may be opposing each other. According to various embodiments, the second mold part 160 may be disposed with a circumferential edge 162 of the second mold part 160 in abutment with the lower wall portion 118 of the peripheral gasket member 110. Accordingly, the second mold part 160 may be fitted to the peripheral gasket member 110 in a manner such that the circumferential edge 162 of the second mold part 160 may be touching or adjoining the lower wall portion 118 of the peripheral gasket member 110. According to various embodiments, the circumferential edge 162 of the second mold part 160 may be fully or entirely abutting the lower wall portion 118 of the peripheral gasket member 110 such that there is no gap around the second mold part 160 between the circumferential edge 162 of the second mold part 160 and the lower wall portion 118 of the peripheral gasket member 110. Further, according to various embodiments, the circumferential edge 162 of the second mold part 160 may be in sealing engagement with the lower wall portion 118 of the peripheral gasket member 110 in a manner such that the second mold part 160 and the peripheral gasket member 110 may be hermetically sealed together in a leak-proof manner.

According to various embodiments, the peripheral gasket member 110, the first mold part 150 and the second mold part 160 may define the molding cavity 102 therebetween. Accordingly, a space enclosed by the peripheral gasket member 110, the first mold part 150 and the second mold part 160 may serve as the molding cavity 102. Hence, the molding cavity 102 may be bound at the top by the first mold part 150, bound at the bottom by the second mold part 160, and bound around by the peripheral gasket member 110.

According to various embodiments, the first mold part 150 may further be in abutment with the annular member 140. Accordingly, the first mold part 150 may be fitted to the peripheral gasket member 110 in a manner such that the first mold part 150 may be touching or adjoining the annular member 140. According to various embodiments, the annular member 140 may be fully or entirely abutting the first mold part 150 such that there is no gap between the annular member 140 and the first mold part 150. Further, according to various embodiments, the annular member 140 may be in sealing engagement with the first mold part 150 in a manner such that the annular member 140 and the first mold part 150 may be hermetically sealed together in a leak-proof manner.

According to various embodiments, the second mold part 160 may be in abutment with the second ridge-flank 114b of the internal circumferential ridge portion 114 of the surrounding wall 112 of the peripheral gasket member 110. Accordingly, the second mold part 160 may be fitted to the peripheral gasket member 110 in a manner such that the second mold part 160 may be touching or adjoining the second ridge-flank 114b of the internal circumferential ridge portion 114 of the surrounding wall 112 of the peripheral gasket member 110. According to various embodiments, the second mold part 160 and the second ridge-flank 114b of the internal circumferential ridge portion 114 of the surrounding wall 112 of the peripheral gasket member 110 may be abutting in a manner such that there is no gap between the second mold part 160 and the second ridge-flank 114b of the internal circumferential ridge portion 114 of the surrounding wall 112 of the peripheral gasket member 110. Further, according to various embodiments, the second mold part 160 may be in sealing engagement with the second ridge-flank 114b of the internal circumferential ridge portion 114 of the surrounding wall 112 of the peripheral gasket member 110 in a manner such that the second mold part 160 and the peripheral gasket member 110 may be hermetically sealed together in a leak-proof manner.

Referring to FIG. 1A and FIG. 1C, according to various embodiments, the first ridge flank 114a of the internal circumferential ridge portion 114 of the surrounding wall 112 of the peripheral gasket member 110 may include a concentric-stepped profile 120. The concentric-stepped profile 120 may be in a radial direction with respect to the axis 111. Accordingly, the axis 111 may serve as a common center of the concentric-stepped profile 120 wherein the steps of the concentric-stepped profile 120 may be arranged radially from the axis 111. According to various embodiments, the concentric-stepped profile 120 may include an outer step 122 and an inner step 124. The inner step 124 may be radially closer to the axis 111 than the outer step 122. As an example as shown in FIG. 1A and FIG. 1C, the concentric-stepped profile 120 may include two steps, i.e. the outer step 122 and the inner step 124. It is understood that the concentric-stepped profile 120 may include at least two (or two or more) steps and is not limited by the embodiment as shown.

According to various embodiments, the segment of the peripheral border region 132 of the film 130 may be in abutment with the inner step 124 of the first ridge-flank 114a of the internal circumferential ridge portion 114 of the surrounding wall 112 of the peripheral gasket member 110 (for example, see FIG. 2A). Hence, the segment of the peripheral border region 132 of the film 130 and the inner step 124 of the first ridge-flank 114a of the internal circumferential ridge portion 114 of the surrounding wall 112 of the peripheral gasket member 110 may be touching or adjoining each other. Accordingly, the inner step 124 of the first ridge-flank 114a of the internal circumferential ridge portion 114 of the surrounding wall 112 of the peripheral gasket member 110 may be supporting the film 130 with the segment of the peripheral border region 132 of the film 130 resting on the inner step 124 of the first ridge-flank 114a of the internal circumferential ridge portion 114 of the surrounding wall 112 of the peripheral gasket member 110. In this manner, the film 130 may be suspended across the through-cavity 113 of the peripheral gasket member 110 with the segment of the peripheral border region 132 of the film 130 supported by the inner step 124 of the first ridge-flank 114a of the internal circumferential ridge portion 114 of the surrounding wall 112 of the peripheral gasket member 110.

According to various embodiments, the annular member 140 may be disposed with an outer border region 142 of the annular member 140 covering the outer step 122 of the first ridge-flank 114a of the internal circumferential ridge portion 114 of the surrounding wall 112 of the peripheral gasket member 110 and an inner border region 144 of the annular member 140 overlapping the segment of the peripheral border region 132 of the film 130 (for example, see FIG. 3A). Since the segment of the peripheral border region 132 of the film 130 is supported on the inner step 124 of the first ridge-flank 114a of the internal circumferential ridge portion 114 of the surrounding wall 112 of the peripheral gasket member 110, the annular member 140 may have a width adequate to cover the inner step 124 and the outer step 122 of the first ridge-flank 114a of the internal circumferential ridge portion 114 of the surrounding wall 112 of the peripheral gasket member 110.

According to various embodiments, the outer border region 142 of the annular member 140 may be in abutment with the outer step 122 of the first ridge-flank 114a of the internal circumferential ridge portion 114 of the surrounding wall 112 of the peripheral gasket member 110. Accordingly, the outer border region 142 of the annular member 140 and the outer step 122 of the first ridge-flank 114a of the internal circumferential ridge portion 114 of the surrounding wall 112 of the peripheral gasket member 110 may be touching or adjoining each other. According to various embodiments, there may be no gap between the outer border region 142 of the annular member 140 and the outer step 122 of the first ridge-flank 114a of the internal circumferential ridge portion 114 of the surrounding wall 112 of the peripheral gasket member 110. According to various embodiments, outer border region 142 of the annular member 140 may be in sealing engagement with the outer step 122 of the first ridge-flank 114a of the internal circumferential ridge portion 114 of the surrounding wall 112 of the peripheral gasket member 110 so as to be hermetically sealed together in a leak-proof manner.

According to various embodiments, the segment of the peripheral border region 132 of the film 130 may be between the inner border region 144 of the annular member 140 and the inner step 124 of the first ridge-flank 114a of the internal circumferential ridge portion 114 of the surrounding wall 112 of the peripheral gasket member 110. According to various embodiments, with the segment of the peripheral border region 132 of the film 130 abutting the inner step 124 of the first ridge-flank 114a of the internal circumferential ridge portion 114 of the surrounding wall 112 of the peripheral gasket member 110, the annular member 140 may be disposed over the segment of the peripheral border region 132 of the film 130 with the inner border region 144 of the annular member 140 over the segment of the peripheral border region 132 of the film 130. Hence, the inner border region 144 of the annular member 140 may be placed over the segment of the peripheral border region 132 of the film 130 such that the segment of the peripheral border region 132 of the film 130 may be retained or kept between the inner border region 144 of the annular member 140 and the inner step 124 of the first ridge-flank 114a of the internal circumferential ridge portion 114 of the surrounding wall 112 of the peripheral gasket member 110. Accordingly, the film 130 may be kept in place by the inner border region 144 of the annular member 140 and the inner step 124 of the first ridge-flank 114a of the internal circumferential ridge portion 114 of the surrounding wall 112 of the peripheral gasket member 110 clamping the segment of the peripheral border region 132 of the film 130.

According to various embodiments, the outer border region 142 of the annular member 140 may be sandwiched between the first mold part 150 and the outer step 122 of the first ridge-flank 114a of the internal circumferential ridge portion 114 of the surrounding wall 112 of the peripheral gasket member 110. Accordingly, with the outer border region 142 of the annular member 140 in abutment with the outer step 122 of the first ridge-flank 114a of the internal circumferential ridge portion 114 of the surrounding wall 112 of the peripheral gasket member 110, the first mold part 150 may be placed or stacked on the annular member 140 such that the annular member 140 may be clamped between the first mold part 150 and the outer step 122 of the first ridge-flank 114a of the internal circumferential ridge portion 114 of the surrounding wall 112 of the peripheral gasket member 110.

According to various embodiments, since the annular member 140 is fastened or secured by the first mold part 150 and the outer step 122 of the first ridge-flank 114a of the internal circumferential ridge portion 114 of the surrounding wall 112 of the peripheral gasket member 110 clamping the outer border region 142 of the annular member 140, the inner border region 144 of the annular member 140 and the inner step 124 of the first ridge-flank 114a of the internal circumferential ridge portion 114 of the surrounding wall 112 of the peripheral gasket member 110 may form a slot or a groove into which the segment of the peripheral border region 132 of the film 130 may be loosely retained. Accordingly, there may be some leeway or freedom for the film 130 to shift or move with the segment of the peripheral border region 132 of the film 130 loosely kept between the inner border region 144 of the annular member 140 and the inner step 124 of the first ridge-flank 114a of the internal circumferential ridge portion 114 of the surrounding wall 112 of the peripheral gasket member 110. Such leeway and freedom may allow the film 130 to shift around when the liquid molding material 105 is filling up the molding cavity 102 so as to minimize, reduce, or avoid any build-up of tension on the film 130 as the liquid molding material 105 pressed against the film 130. Hence, distortion, deformation and/or damage to the film 130 may also be minimized, reduced, or avoided.

Referring to FIG. 1C, according to various embodiments, the outer step 122 of the first ridge-flank 114a of the internal circumferential ridge portion 114 of the surrounding wall 112 of the peripheral gasket member 110 may have a riser surface 122b and a thread surface 122a. The riser surface 122b of the outer step 122 may be oriented parallel to the axis 111. The thread surface 122a of the outer step 122 may be inclined to form an acute angle with the riser surface 122b of the outer step 122. Hence, the riser surface 122b of the outer step 122 may be a vertical surface parallel to the axis 111 and the thread surface 122a of the outer step 122 may be an inclined surface that converges and meet the vertical surface. Accordingly, the outer step 122 may have a saw-tooth-like or jagged cross-sectional profile.

According to various embodiments, the inner step 124 of the first ridge-flank 114a of the internal circumferential ridge portion 114 of the surrounding wall 112 of the peripheral gasket member 110 may have a thread surface 124a parallel to the thread surface 122a of the outer step 122. Accordingly, the thread surface 124a of the inner step 124 may be an inclined surface corresponding to the thread surface 122a of the outer step 122.

According to various embodiments, the inner step 124 may be adjacent to the outer step 122. Accordingly, the outer step 122 may be immediately next to the inner step 124. Hence, the riser surface 122b of the outer step 122 may be between the thread surface 122a of the outer step 122 and the thread surface 124a of the inner step 124. Thus, thread surface 124a of the inner step 124 may be followed by the riser surface 122b of the outer step 122 and followed by the thread surface 122a of the outer step 122 in an outward radial direction with respect to the axis 111.

According to various embodiments, the second ridge-flank 114b of the internal circumferential ridge portion 114 of the surrounding wall 112 of the peripheral gasket member 110 may include a protruding free-edge 126 extending in the second direction 111b. Accordingly, the protruding free-edge 126 may be extending from the second ridge-flank 114b of the internal circumferential ridge portion 114 in a direction away from the first ridge-flank 114a of the internal circumferential ridge portion 114. According to various embodiments, the protruding free-edge 126 may be tapered, pointed or rounded. According to various embodiments, the second mold part 160 may be in abutment with the protruding free-edge 126 of the second ridge-flank 114b of the internal circumferential ridge portion 114 of the surrounding wall 112 of the peripheral gasket member 110. Accordingly, the second mold part 160 may be touching or adjoining the protruding free-edge 126 of the second ridge-flank 114b of the internal circumferential ridge portion 114 of the surrounding wall 112 of the peripheral gasket member 110. According to various embodiments, the protruding free-edge 126 may form a continuous endless loop. Accordingly, the protruding free-edge 126 may be fully or entirely abutting the second mold part 160.

According to various embodiments, the annular member 140 may be made of a same material as the peripheral gasket member 110. For example, each of the annular member 140 and the peripheral gasket member 110 may be made of or coated with polytetrafluoroethylene (PTFE, also known as Teflon), or elastomer.

According to various embodiments, the film 130 may include notches 134 (for example, see FIG. 2B) or cut-outs (e.g. circular segment cut-outs). The notches 134 or cut-outs may facilitate the liquid molding material 105 to flow across the film 130 for filling up the molding cavity 102 in a manner so as to have the liquid molding material 105 on both sides of the film 130. Accordingly, the liquid molding material 105 may harden to form the lens with the film 130 embedded therein.

According to various embodiments, the surrounding wall 112 of the peripheral gasket member 110 may include a filling canal 170 for filling the molding cavity 102 with the liquid molding material 105. The filling canal 170 may be embedded within the peripheral gasket member 110. Further, the filling canal 170 may include an inlet port exposed from the exterior of the peripheral gasket member 110 for connecting to a source for the liquid molding material 105. The filing canal 170 may also include an outlet port opening into the through-cavity 113 of the peripheral gasket member 110 for liquid molding material 105 to flow into the molding cavity when the molding assembly 100 is assembled.

Referring to FIG. 1A, FIG. 2A, FIG. 3A and FIG. 4A, according to various embodiments, the method of assembling the molding assembly 100 may include providing the peripheral gasket member 110; disposing the film 130 at the first ridge-flank 114a of the internal circumferential ridge portion 114 of the peripheral gasket member 110 with the segment of the peripheral border region 132 of the film 130 in abutment with the first ridge-flank 114a of the internal circumferential ridge portion 114 of the peripheral gasket member 110; disposing the annular member 140 over the segment of the peripheral border region 132 of the film 130 in a manner so as to retain the segment of the peripheral border region 132 of the film 130 between the annular member 140 and the first ridge-flank 114a of the internal circumferential ridge portion 114 of the peripheral gasket member 110; disposing the first mold part 150 with the circumferential edge 152 of the first mold part 150 in abutment with the upper wall portion 116 of the peripheral gasket member 110; and disposing the second mold part 160 in an opposing manner with respect to the first mold part 150 and with the circumferential edge 162 of the second mold part 160 in abutment with the lower wall portion 118 of the peripheral gasket member 110. Referring to FIG. 1A, FIG. 2A, FIG. 3A, FIG. 4A and FIG. 5, according to various embodiments, the method of molding the lens may include the method of assembling the molding assembly 100 and additionally include filing the molding cavity 102, defined by the peripheral gasket member 110, the first mold part 150 and the second mold part 160, with the liquid molding material 105 for molding the lens.

According to various embodiments, the method of assembling the molding assembly 100 and/or the method of molding the lens may further include disposing the first mold part 150 to abut the annular member 140, and disposing the second mold part 160 to abut the second ridge-flank 114b of the internal circumferential ridge portion 114 of the peripheral gasket member 110.

According to various embodiments, the method of assembling the molding assembly 100 and/or the method of molding the lens may further include disposing the first mold part 150 to sandwich the outer border region 142 of the annular member 140 between the first mold part 160 and the outer step 122 of the first ridge-flank 114a of the internal circumferential ridge portion 114 of the peripheral gasket member 110.

According to various embodiments, the method of molding the lens may further include curing the liquid molding material 105 within the molding assembly 100; removing the first mold part 150 from the peripheral gasket member 110; removing the second mold part 160 from the peripheral gasket member 110; removing the annular member 140 from the peripheral gasket member 140; and removing the lens from the peripheral gasket member 110 with the film 130 embedded in the lens.

Various embodiments have provided a simple, reliable, less operator-dependent and more efficient solution for molding a lens (e.g. polarized lens). According to various embodiments, the complexity and difficulty associated with inserting the film to the gasket in a conventional method have been avoided or eliminated. Further, in the various embodiments, the film may now be easily placed without causing deformation and/or damage to the film. The process of placing the film may no longer require highly skilled operator. Further, the method of the various embodiments may also be capable of being automated.

Although representative processes and articles have been described in detail herein, those skilled in the art will recognize that various substitutions and modifications may be made without departing from the scope of what is described and defined by the appended claims.

What is claimed is:

1. An assembly for molding a lens comprising:
   a peripheral gasket member comprising a surrounding wall around an axis to define a through-cavity extending along the axis, the surrounding wall having an internal circumferential ridge portion protruding inwardly towards the axis from an inner side of the surrounding wall in a manner so as to partition the surrounding wall into an upper wall portion and a lower wall portion respectively above and below the internal circumferential ridge portion with respect to the axis, wherein the internal circumferential ridge portion comprises
      a first ridge-flank directed in a first direction corresponding to a direction extending along the axis from the internal circumferential ridge portion to the upper wall portion, and
      a second ridge-flank directed in a second direction corresponding to a direction extending along the axis from the internal circumferential ridge portion to the lower wall portion;
   a film disposed at the first ridge-flank of the internal circumferential ridge portion of the peripheral gasket member with a segment of a peripheral border region of the film in abutment with the first ridge-flank of the internal circumferential ridge portion of the peripheral gasket member;
   an annular member disposed over the segment of the peripheral border region of the film in a manner so as to retain the segment of the peripheral border region of the film between the annular member and the first ridge-flank of the internal circumferential ridge portion of the peripheral gasket member;
   a first mold part disposed with a circumferential edge of the first mold part in abutment with the upper wall portion of the peripheral gasket member; and
   a second mold part disposed in an opposing manner with respect to the first mold part and with a circumferential edge of the second mold part in abutment with the lower wall portion of the peripheral gasket member,
   wherein the peripheral gasket member, the first mold part and the second mold part define a molding cavity therebetween, and
   wherein:
   the first ridge flank of the internal circumferential ridge portion of the peripheral gasket member comprises a concentric-stepped profile in a radial direction with respect to the axis, the concentric-stepped profile comprising an outer step and an inner step, wherein the inner step is radially closer to the axis than the outer step,
   the segment of the peripheral border region of the film is in abutment with the inner step of the first ridge-flank of the internal circumferential ridge portion of the peripheral gasket member,
   the annular member is disposed with an outer border region of the annular member covering the outer step of the first ridge-flank of the internal circumferential ridge portion of the peripheral gasket member and an inner border region of the annular member overlapping the segment of the peripheral border region of the film in a manner so as to retain the segment of the peripheral border region of the film between the inner border region of the annular member and the inner step of the first ridge-flank of the internal circumferential ridge portion of the peripheral gasket member.

2. The assembly as claimed in claim 1, wherein the first mold part is in abutment with the annular member and the second mold part is in abutment with the second ridge-flank of the internal circumferential ridge portion of the peripheral gasket member.

3. The assembly as claimed in claim 2, wherein the outer border region of the annular member is sandwiched between the first mold part and the outer step of the first ridge-flank of the internal circumferential ridge portion of the peripheral gasket member.

4. The assembly as claimed in claim 1, wherein the outer step has a riser surface oriented parallel to the axis and a thread surface inclined to form an acute angle with the riser surface of the outer step.

5. The assembly as claimed in claim 4, wherein the inner step has a thread surface parallel to the thread surface of the outer step, and wherein the inner step is adjacent to the outer step such that the riser surface of the outer step is between the thread surface of the outer step and the thread surface of the inner step.

6. The assembly as claimed in claim 1, wherein the second ridge-flank comprises a protruding free-edge extending in the second direction, and wherein the second mold part is in abutment with the protruding free-edge of the second ridge-flank.

7. The assembly as claimed in claim 1, wherein the annular member is made of a same material as the peripheral gasket member.

8. The assembly as claimed in claim 1, wherein the film comprises notches or circular segment cut-outs.

9. The assembly as claimed in claim 1, wherein the surrounding wall of the peripheral gasket member comprises a filling canal for filling the molding cavity with a liquid molding material.

10. A method of molding a lens, comprising:
    providing a peripheral gasket member comprising a surrounding wall around an axis to define a through-cavity extending along the axis, the surrounding wall having an internal circumferential ridge portion protruding inwardly towards the axis from an inner side of the surrounding wall in a manner so as to partition the surrounding wall into an upper wall portion and a lower wall portion respectively above and below the internal circumferential ridge portion with respect to the axis, wherein the internal circumferential ridge portion comprises
       a first ridge-flank directed in a first direction corresponding to a direction extending along the axis from the internal circumferential ridge portion to the upper wall portion, and
       a second ridge-flank directed in a second direction corresponding to a direction extending along the axis from the internal circumferential ridge portion to the lower wall portion;
    disposing a film at the first ridge-flank of the internal circumferential ridge portion of the peripheral gasket member with a segment of a peripheral border region of the film in abutment with the first ridge-flank of the internal circumferential ridge portion of the peripheral gasket member;
    disposing an annular member over the segment of the peripheral border region of the film in a manner so as to retain the segment of the peripheral border region of the film between the annular member and the first ridge-flank of the internal circumferential ridge portion of the peripheral gasket member;

disposing a first mold part with a circumferential edge of the first mold part in abutment with the upper wall portion of the peripheral gasket member;

disposing a second mold part in an opposing manner with respect to the first mold part and with a circumferential edge of the second mold part in abutment with the lower wall portion of the peripheral gasket member; and filing a molding cavity, defined by the peripheral gasket member, the first mold part and the second mold part, with a liquid molding material for molding the lens, wherein:

- the first ridge flank of the internal circumferential ridge portion of the peripheral gasket member comprises a concentric-stepped profile in a radial direction with respect to the axis, the concentric-stepped profile comprising an outer step and an inner step, wherein the inner step is radially closer to the axis than the outer step,
- disposing the film further comprises disposing the segment of the peripheral border region of the film to abut the inner step of the first ridge-flank of the internal circumferential ridge portion of the peripheral gasket member,
- disposing the annular member further comprises disposing the annular member with an outer border region of the annular member to cover the outer step of the first ridge-flank of the internal circumferential ridge portion of the peripheral gasket member and an inner border region of the annular member to overlap the segment of the peripheral border region of the film in a manner so as to retain the segment of the peripheral border region of the film between the inner border region of the annular member and inner step of the first ridge-flank of the internal circumferential ridge portion of the peripheral gasket member.

11. The method as claimed in claim 10, wherein disposing the first mold part further comprises disposing the first mold part to abut the annular member, and wherein disposing the second mold part further comprises disposing the second mold part to abut the second ridge-flank of the internal circumferential ridge portion of the peripheral gasket member.

12. The method as claimed in claim 11, wherein disposing the first mold part to abut the annular member comprise disposing the first mold part to sandwich the outer border region of the annular member between the first mold part and the outer step of the first ridge-flank of the internal circumferential ridge portion of the peripheral gasket member.

13. The method as claimed in claim 10, further comprising curing the liquid molding material;

removing the first mold part from the peripheral gasket member;

removing the second mold part from the peripheral gasket member;

removing the annular member from the peripheral gasket member; and removing the lens from the peripheral gasket member with the film embedded in the lens.

* * * * *